(12) United States Patent
Pyles et al.

(10) Patent No.: US 8,011,444 B2
(45) Date of Patent: Sep. 6, 2011

(54) SPINDLE LOCKING ASSEMBLY

(75) Inventors: Douglas E. Pyles, Bethlehem, PA (US);
Randi J. Young, Randolph, NJ (US)

(73) Assignee: Ingersoll Rand Company, Montvale, NJ (US)

( * ) Notice: Subject to any disclaimer, the term of this patent is extended or adjusted under 35 U.S.C. 154(b) by 244 days.

(21) Appl. No.: 12/418,205

(22) Filed: Apr. 3, 2009

(65) Prior Publication Data

US 2010/0252292 A1 Oct. 7, 2010

(51) Int. Cl.
*E21B 3/00* (2006.01)
(52) U.S. Cl. .......... 173/164; 173/171; 408/124; 188/69
(58) Field of Classification Search .......... 173/164, 173/216, 217; 409/231, 233; 408/124
See application file for complete search history.

(56) References Cited

U.S. PATENT DOCUMENTS

| | | | |
|---|---|---|---|
| 1,497,483 A | | 6/1924 | Callender et al. |
| 2,395,534 A | | 2/1946 | Cook |
| 2,612,377 A | | 9/1952 | Edens |
| 2,731,273 A | * | 1/1956 | Edens .............................. 279/81 |
| 2,881,006 A | | 4/1959 | Amiet |
| 3,044,091 A | | 7/1962 | Nishihama |
| 3,179,965 A | | 4/1965 | Khachigian |
| 3,334,448 A | | 8/1967 | Alexander |
| 3,527,466 A | | 9/1970 | Sweeny |
| 3,679,244 A | | 7/1972 | Reddy |
| 3,743,307 A | * | 7/1973 | Benjamin et al. ................ 279/91 |
| 3,747,946 A | * | 7/1973 | Edens .............................. 279/81 |
| 3,774,699 A | | 11/1973 | Schmuck |
| 3,802,518 A | | 4/1974 | Albert |
| 3,872,951 A | | 3/1975 | Hastings, Jr. |
| 4,078,589 A | | 3/1978 | Miller |
| 4,204,303 A | | 5/1980 | Eidam |
| 4,400,995 A | | 8/1983 | Palm |
| 4,467,896 A | | 8/1984 | Sauerwein et al. |

(Continued)

FOREIGN PATENT DOCUMENTS

DE 4105340 8/1992

(Continued)

OTHER PUBLICATIONS

International Search Report for Application No. PCT/US2010/026657, dated May 4, 2010 (2 pages).

(Continued)

*Primary Examiner* — Sameh H. Tawfik
*Assistant Examiner* — Andrew M Tecco
(74) *Attorney, Agent, or Firm* — Michael Best & Friedrich LLP (57) ABSTRACT

A locking assembly for the spindle of a tool includes a locking member, a biasing member interconnected with the locking member, and a collar surrounding a portion of the spindle. The spindle includes a spindle slot that receives the locking member to lock the spindle with respect to the tool housing. The collar may be rotated into an unlocked position in which the biasing member holds the locking member out of engagement with the spindle slot. The collar may also be rotated into a locked position in which a cam surface in the collar acts on the biasing member to apply a biasing force on the locking member toward engagement with the spindle slot. The biasing member may deflect to accommodate rotation of the collar into the locked position with the spindle slot not aligned with the locking member.

12 Claims, 7 Drawing Sheets

U.S. PATENT DOCUMENTS

| | | | |
|---|---|---|---|
| 4,489,525 A | | 12/1984 | Heck |
| 4,503,728 A | | 3/1985 | Fischer et al. |
| 4,526,497 A | | 7/1985 | Hatfield |
| 4,527,680 A | | 7/1985 | Sato |
| 4,563,116 A | * | 1/1986 | Edens ............................ 409/136 |
| 4,609,199 A | | 9/1986 | Rohm |
| 4,690,252 A | | 9/1987 | Kottke et al. |
| 4,702,485 A | * | 10/1987 | Rohm ............................ 279/19.4 |
| 4,754,669 A | | 7/1988 | Verdier et al. |
| 4,804,048 A | | 2/1989 | Porth, Jr. |
| 4,824,298 A | * | 4/1989 | Lippacher et al. ............ 408/240 |
| 4,919,023 A | * | 4/1990 | Bloink ............................. 82/160 |
| 5,016,501 A | | 5/1991 | Holzer, Jr. |
| 5,156,244 A | | 10/1992 | Pyles et al. |
| 5,191,968 A | | 3/1993 | McCurry |
| 5,496,139 A | | 3/1996 | Ghode et al. |
| 5,810,366 A | | 9/1998 | Montjoy et al. |
| 5,820,135 A | | 10/1998 | Han et al. |
| 5,951,026 A | | 9/1999 | Harman, Jr. et al. |
| 6,079,716 A | | 6/2000 | Harman, Jr. et al. |
| 6,223,833 B1 | | 5/2001 | Thurler et al. |
| 6,261,036 B1 | | 7/2001 | Bosten et al. |
| 6,273,200 B1 | | 8/2001 | Smith et al. |
| 6,293,559 B1 | | 9/2001 | Harman, Jr. et al. |
| 6,350,087 B1 | | 2/2002 | Berry et al. |
| 6,485,360 B1 | | 11/2002 | Hutchins |
| 6,513,604 B2 | | 2/2003 | Hanke |
| 6,550,546 B2 | | 4/2003 | Thurler et al. |
| 6,550,786 B2 | | 4/2003 | Gifford et al. |
| 6,688,611 B2 | | 2/2004 | Gifford et al. |
| 6,805,206 B2 | * | 10/2004 | Hanke .............................. 173/48 |
| 6,886,643 B2 | | 5/2005 | Riley et al. |
| 6,974,370 B2 | | 12/2005 | Hutchins |
| 7,052,022 B2 | | 5/2006 | Chudy et al. |
| 7,073,606 B2 | | 7/2006 | Mamber et al. |
| 7,073,608 B2 | | 7/2006 | Droste |
| 7,264,429 B2 | | 9/2007 | Miller |
| 7,273,214 B2 | | 9/2007 | Harris |
| 7,325,812 B2 | | 2/2008 | Long et al. |
| 7,344,141 B2 | | 3/2008 | Schnell et al. |
| 7,455,302 B2 | | 11/2008 | Young et al. |
| 7,472,913 B2 | | 1/2009 | Gong et al. |
| 2004/0202518 A1 | * | 10/2004 | Yaksich et al. ................ 408/240 |
| 2005/0260052 A1 | | 11/2005 | Lovchik et al. |
| 2006/0232023 A1 | | 10/2006 | Yaksich |
| 2007/0132196 A1 | | 6/2007 | Puzio et al. |
| 2007/0144752 A1 | | 6/2007 | Pozgay et al. |
| 2007/0267207 A1 | | 11/2007 | Ito |

FOREIGN PATENT DOCUMENTS

| | | |
|---|---|---|
| EP | 1190796 | 3/2002 |
| WO | 2007/129957 | 11/2007 |

OTHER PUBLICATIONS

Written Opinion for Application No. PCT/US2010/026657, dated May 4, 2010 (5 pages).

* cited by examiner

SPINDLE LOCKING ASSEMBLY

BACKGROUND

The present invention relates to a spindle locking assembly for a tool having a rotating spindle.

SUMMARY

In one embodiment, the invention provides a locking assembly for a spindle defining a longitudinal axis and having a spindle slot, the spindle supported for rotation about the longitudinal axis in a housing. The locking assembly comprises: a locking member supported for movement perpendicular to the longitudinal axis into and out of engagement with the spindle slot, the locking member preventing rotation of the spindle with respect to the housing when engaged with the spindle slot and permitting rotation of the spindle with respect to the housing when disengaged from the spindle slot; a biasing member interconnected with the locking member; and a collar surrounding a portion of the spindle, the collar including at least one cam surface and being rotatable about the longitudinal axis with respect to the spindle and housing between an unlocked position and a locked position. Rotation of the collar into the unlocked position enables the biasing member to bias the locking member out of engagement with the spindle slot; and rotation of the collar into the locked position causes the cam surface to abut and deflect the biasing member such that the biasing member biases the locking member toward engagement with the spindle slot. The biasing member deflects to accommodate rotation of the collar into the locked position with the spindle slot not aligned with the locking member.

In another embodiment, the invention provides a tool comprising: a housing; a spindle; and a locking assembly as described above for selectively locking the spindle with respect to the housing.

In some embodiments, a clamp nut may be rotationally fixed with respect to the housing, the clamp nut including a cylindrical portion defining a central bore through which the spindle extends; wherein the cylindrical portion includes a radial opening through which the locking member is movable to engage the spindle slot when the spindle slot is aligned with the radial opening. The biasing member may include a portion extending through the locking member and abutting and following the cam surface as the collar is rotated into the locked position. The biasing member may include a detent bend, wherein the collar further includes a locked detent groove and an unlocked detent groove; wherein the detent bend is received in the locked detent groove in response to the collar being rotated to the locked position to resist rotation of the collar out of the locked position; and wherein the detent bend is received in the unlocked detent groove in response to the collar being rotated to the unlocked position to resist rotation of the collar out of the unlocked position. The biasing member may include a pivot section that is pivotably supported with respect to the housing, such that the biasing member pivots about the pivot section as the collar is rotated between the locked and unlocked positions. The biasing member may include a wire spring having a first end extending through the locking member and abutting and following the cam surface as the collar is rotated into the locked position; wherein the biasing member further includes a second end defining a detent bend; wherein the collar further includes a locked detent groove and an unlocked detent groove; wherein the detent bend is received in the locked detent groove in response to the collar being rotated to the locked position to resist rotation of the collar out of the locked position; wherein the detent bend is received in the unlocked detent groove in response to the collar being rotated to the unlocked position to resist rotation of the collar out of the unlocked position; and wherein the biasing member further includes a pivot section between the first and second ends, the pivot section being pivotably supported with respect to the housing, such that the biasing member pivots about the pivot section as the collar is rotated between the locked and unlocked positions. The locking assembly may include a pivot support pin affixed with respect to the housing; wherein the pivot section includes a loop in the wire spring; and wherein the loop extends around the pivot support pin such that the pivot support pin supports the wire spring for pivoting as the collar is rotated between the locked and unlocked positions.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
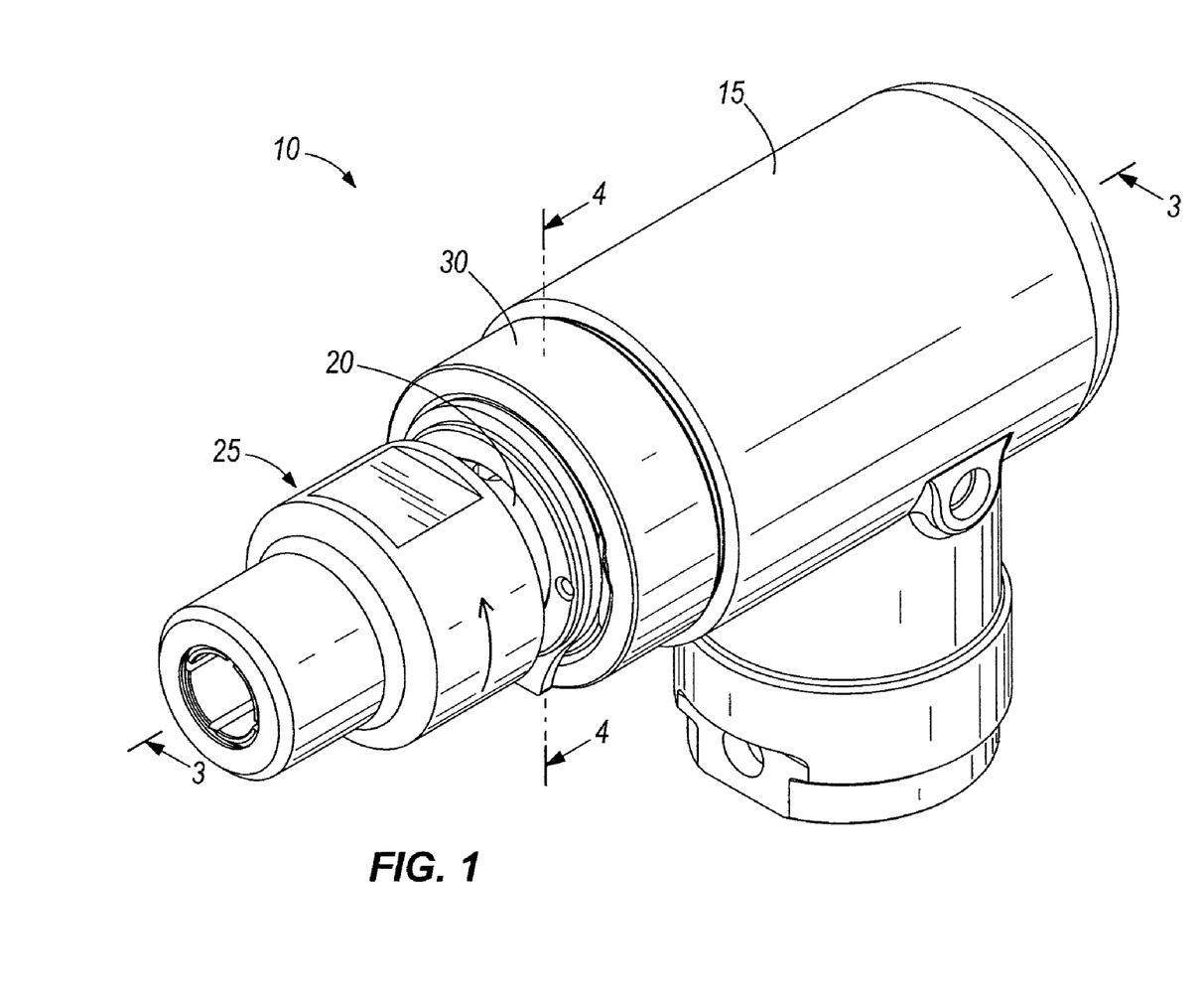
FIG. 1 illustrates a portion of a tool according to the present invention.

FIG. 1 illustrates a power tool 10, which in the illustrated embodiment is a pneumatic grinder but in other embodiments may be an electric tool 10 or substantially any tool 10 having a rotating spindle. The tool 10 includes a housing 15, a spindle assembly 20, a collet assembly 25, and a locking assembly 30.

Figure 2:
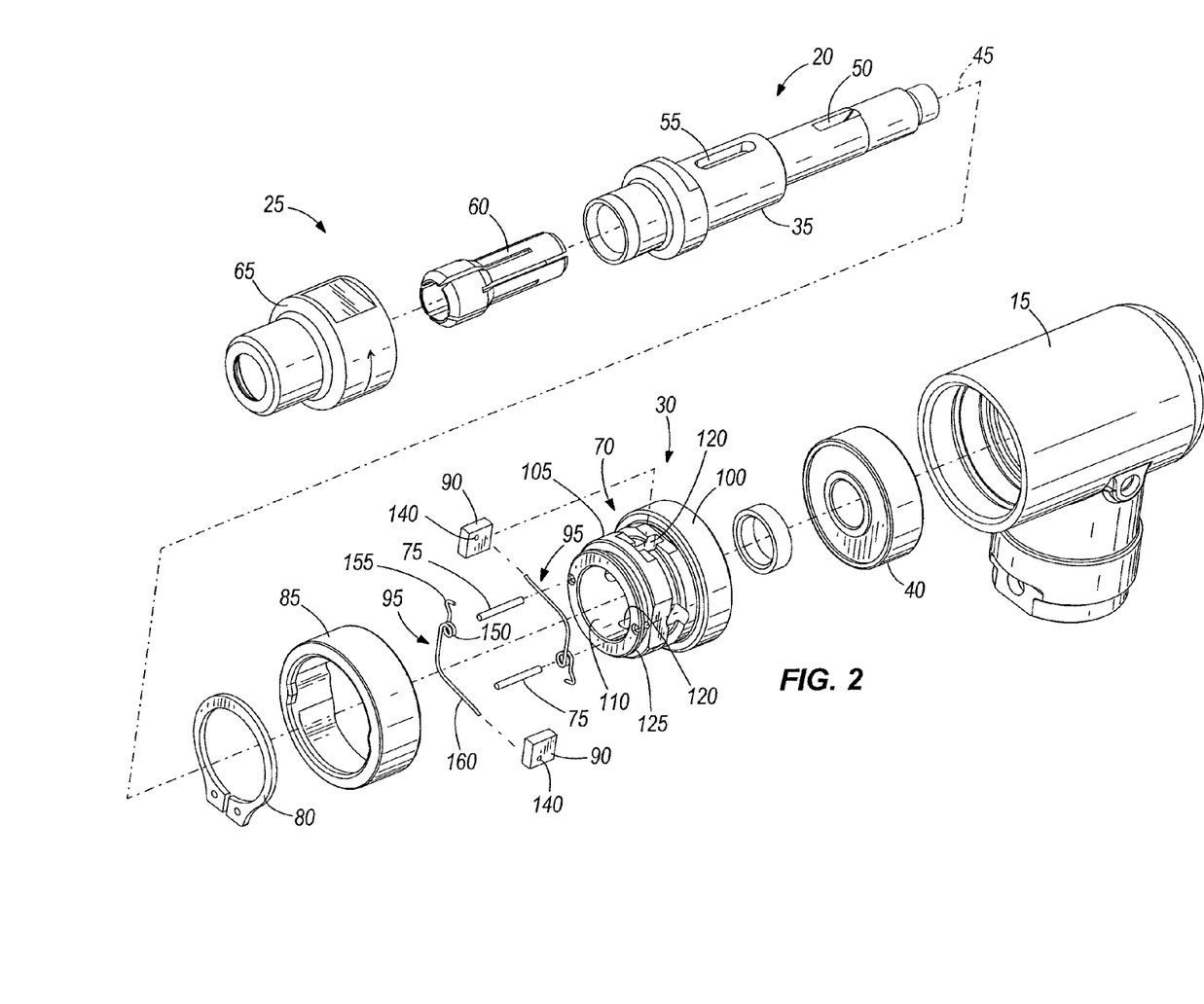
FIG. 2 is an exploded view of the tool of FIG. 1.
Figure 3:
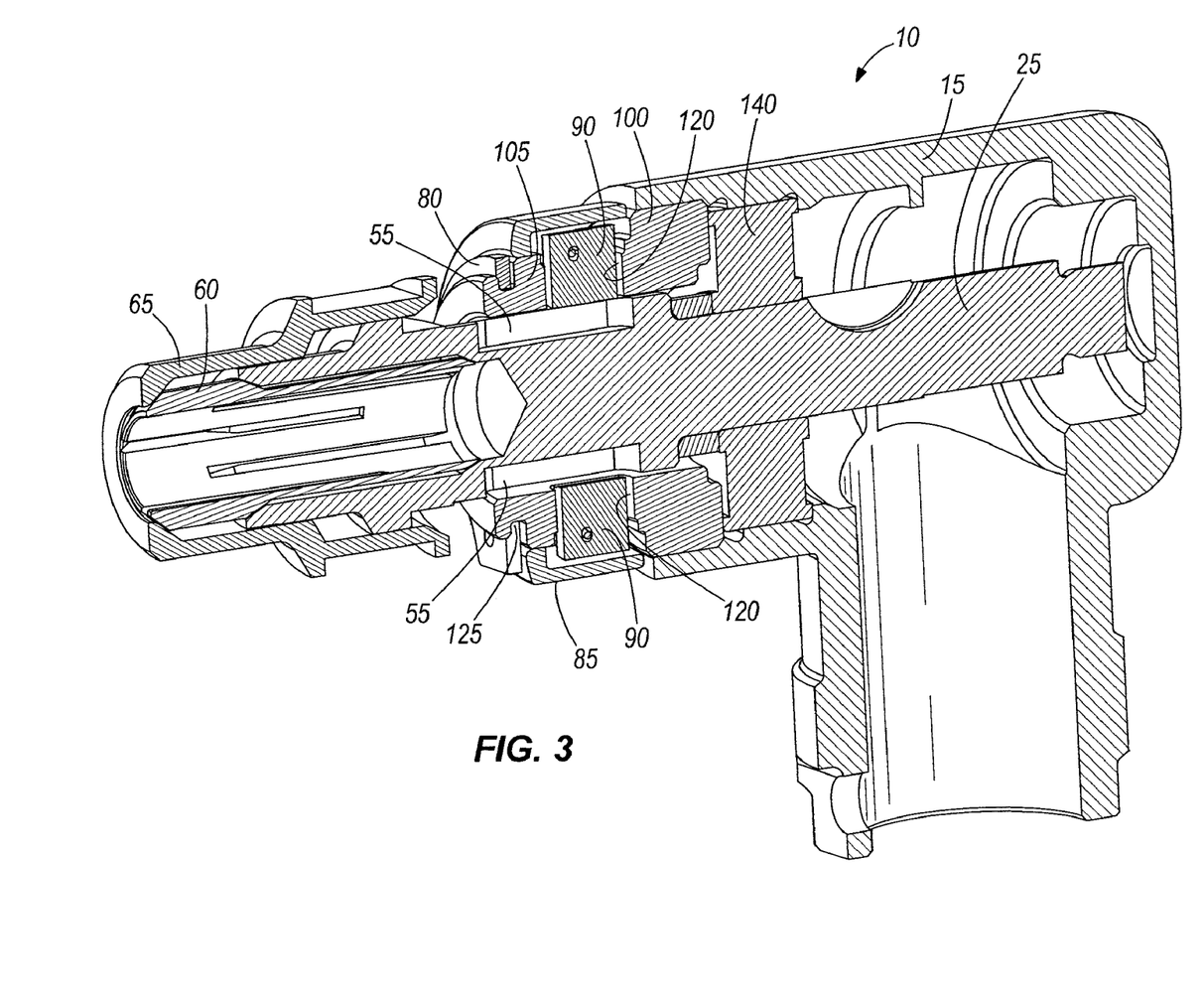
FIG. 3 is a cross-sectional view along line 3-3 in FIG. 1.

With reference to FIG. 2, the spindle assembly 20 includes a spindle 35 and a bearing 40 supporting the spindle 35 in cantilever fashion for rotation within the housing 15. The spindle 35 defines a longitudinal axis 45, which is also its axis of rotation, and has a keyway 50 and a pair of diametrically-opposed spindle slots 55. In other embodiments, the spindle slots 55 can take on other shapes and sizes, including a round hole, and may be referred to as an orifice, hole or other type of aperture. The illustrated embodiment is a right angle grinder, in which a bevel gear is affixed to the spindle 35 by way of a key in the keyway 50. The bevel gear meshes at right angles with a pinion that is affixed to an output shaft of the tool's motor. The motor shaft is thus generally perpendicular or at a right angle to the longitudinal axis 45 of the spindle 35 in the illustrated embodiment. In other embodiments, such as straight and straight-extended embodiments, the spindle 35 may be threaded onto or into the output shaft of the motor, which would eliminate the need for the keyway 50. The spindle 35 also includes a distal end connected to the collet assembly 25. All illustrated elements of the tool 10 are coaxial with the longitudinal axis 45 unless otherwise specified.

The collet assembly 25 includes a collet 60 and a collet nut 65. The collet nut 65 is threaded onto the distal end of the spindle 35. Rotating the collet nut 65 in a first direction with respect to the spindle 35 causes the collet 60 to open and rotating the collet nut 65 in a second direction, opposite the first direction, with respect to the spindle 35 causes the collet 60 to close. Attachments are removed from the collet 60 by rotating the collet nut 65 in the first direction with respect to the spindle 35, and are secured to the collet 60 by rotating the collet nut 65 in the second direction with respect to the spindle 35 until sufficient normal force and surface friction are created between the collet 60 and attachment to couple the attachment and spindle 35 for rotation together during ordinary operating conditions.

The locking assembly 30 provides a mechanism for coupling the spindle 35 to the housing 15 to prevent rotation of the spindle 35 with respect to the housing 15. Because the housing 15 is relatively large and easy to handle by an operator compared to the spindle 35, the locking assembly 30 provides a means for manually resisting rotation of the spindle 35 (i.e., by manually resisting rotation of the tool housing 15) as a wrench is applied to the collet nut 65 and the collet nut 65 is turned in the first or second directions with respect to the spindle 35 and tool housing 15. This obviates the need for a second wrench applied to the spindle 35 when tightening and loosening the collet nut 65.

The locking assembly 30 includes a clamp nut 70, a pair of pins 75, a retaining ring 80, a collar 85, a pair of locking members 90, and a pair of biasing members or springs 95. The clamp nut 70 includes an enlarged outer diameter male threaded portion 100 and a reduced outer diameter cylindrical portion 105. A central bore 110 extends through the threaded portion 100 and cylindrical portion 105 of the clamp nut 70, and the spindle 35 extends through the central bore 110. The threaded portion 100 of the clamp nut 70 threads into female threads in the housing 15. When threaded into the housing 15, the clamp nut 70 clamps the bearing 40 within the housing 15. The cylindrical portion 105 includes a diametrically-opposed pair of radial openings 120 and a circumferential groove 125. In other embodiments, the openings 120 can take on other shapes and sizes, including a round hole or slot, and may be referred to as an orifice, hole or other type of aperture.

The pair of pins 75 are affixed to diametrically-opposed portions of the threaded portion 100 of the clamp nut 70 and extend parallel to the cylindrical portion 105. In other words, the pins 75 extend longitudinally and are spaced from the cylindrical portion 105.

The collar 85 extends around the cylindrical portion 105 of the clamp nut 70, over the radial openings 120. The retaining ring 80 sits in the circumferential groove 125 and retains the collar 85 on the cylindrical portion 105 of the clamp nut 70 (i.e., resists longitudinal movement of the collar 85 off the cylindrical portion 105). The collar 85 covers the pins 75, locking members 90, and springs 95. With reference to FIGS. 4-7, the inner surface of the collar 85 includes cam surfaces 130, locked detents 135, and unlocked detents 140 that interact with the springs 95 to cause the locking members 90 to move into and out of engagement with the spindle slots 55.

Figure 7:
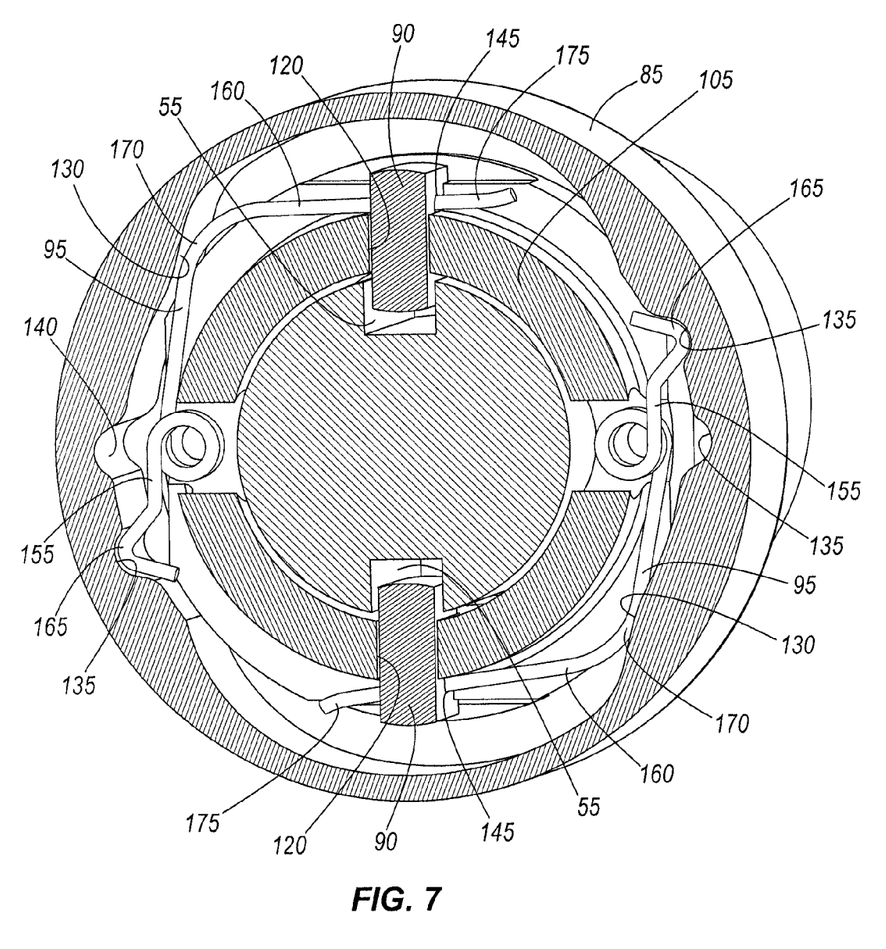
FIG. 7 is a view similar to FIG. 4, with the locking assembly in a locked position.

The locking members 90 are within the radial openings 120 in the cylindrical portion 105 of the clamp nut 70, and are movable radially (i.e., perpendicular to the longitudinal axis 45) between an unlocked position (FIG. 4) and a locked position (FIG. 7). Each locking member 90 includes a spring slot 145. The locking members 90 have longitudinal extents that are generally perpendicular to the longitudinal axis 45 of the spindle 35, and for the sake of convenience in this disclosure, an element is said to be parallel or perpendicular to the locking member 90 if it is parallel or perpendicular to the longitudinal extent of the locking member 90. The spring slot 145 extends generally parallel to the locking member 90. For the sake of reference in this disclosure, the top of the spring slot 145 is the end furthest from the spindle 35 and the bottom of the spring slot 145 is the end closest to the spindle 35. The spring slot 145 is shaped to accommodate the full expected range of angles of the spring 95 with respect to the locking member 90. In other embodiments, the spring slot 145 can take on other shapes and sizes, including a round hole, and may be referred to as an orifice, hole or other type of aperture.

The springs 95 are generally elongated and wire-shaped in the illustrated embodiment and in this regard may be referred to as wire springs 95. Each spring 95 includes a loop 150, a first end 155 to one side of the loop 150, and a second end 160 on an opposite side of the loop 150. The side of the locking member 90 facing generally toward the loop 150 is referred to herein as the "near side" of the locking member 90, and the side of the locking member 90 facing generally away from the loop 150 is referred to herein as the "far side" of the locking member 90. The first end 155 is shorter than the second end 160 in the illustrated embodiment. The first end 155 includes a detent bend 165. The second end 160 includes a cam-following bend 170 that engages the inner cam surface 130 of the collar 85, and a tip 175 that extends through the spring slot 145 in one of the locking members 90.

Figure 4:
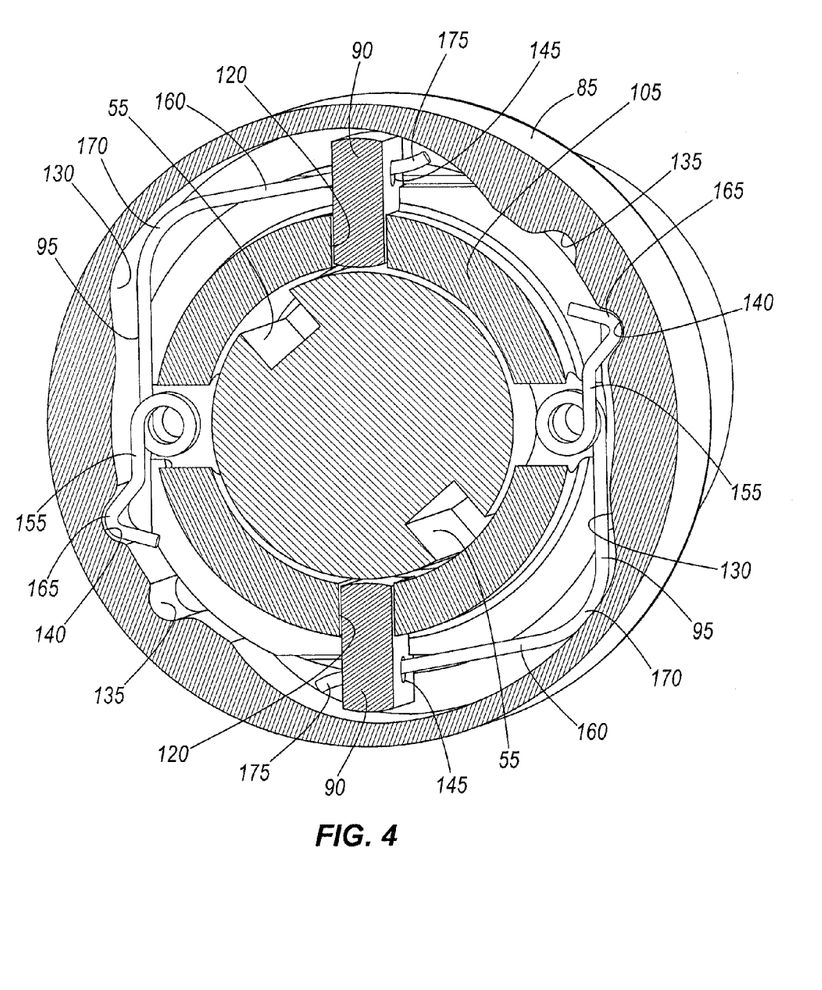
FIG. 4 is a perspective cross-sectional view along line 4-4 in FIG. 1, illustrating a locking assembly in an unlocked position.

Operation of the locking assembly 30 will now be discussed with respect to only one of the spring 95 and locking member 90 assemblies for the sake of simplicity, it being understood that the two spring and locking member assemblies operate in identical fashion. When the collar 85 is in the unlocked position, as illustrated in FIG. 4, the tip 175 of the spring applies a biasing force to the spring slot 145, which biases the locking member radially outwardly, away from the spindle 35. The first end 155 of the spring is non-parallel to the locking member 90, and contacts the locking member 90 at the top of the spring slot 145 on the far side of the locking member 90. The detent bend 165 of the spring 95 is received in the unlocked detent 140.

When the collar 85 is rotated about the longitudinal axis 45 in a first, locking direction (i.e., clockwise in FIGS. 4-7), to the locked position, the detent bend 165 rides out of the unlocked detent 140 and slides into the locked detent 135, such that operator is given tactile feedback that the locking assembly 30 is in the locked position. As the collar 85 is rotated in the locking direction, the cam surface 130 pushes on the cam-following bend 170 of the spring 95, which pivots the spring 95 about the pin 75. Pivoting the spring 95 about the pin 75 simultaneously causes the second end 160 of the spring 95 to move toward the spindle 35 and the spring tip 175 to extend through the spring slot 145 of the locking member 90.

With reference to FIG. 7, if the radial opening 120 happens to be aligned with the spindle slot 55 when the collar 85 is rotated to the locked position, the first end 155 of the spring 95 pushes the locking member 90 into the spindle slot 55 with a radially-directed force. The second end 160 of the spring 95 is generally perpendicular to the locking member 90, and extends across and acts on the bottom of the spring slot 145.

Figure 5:
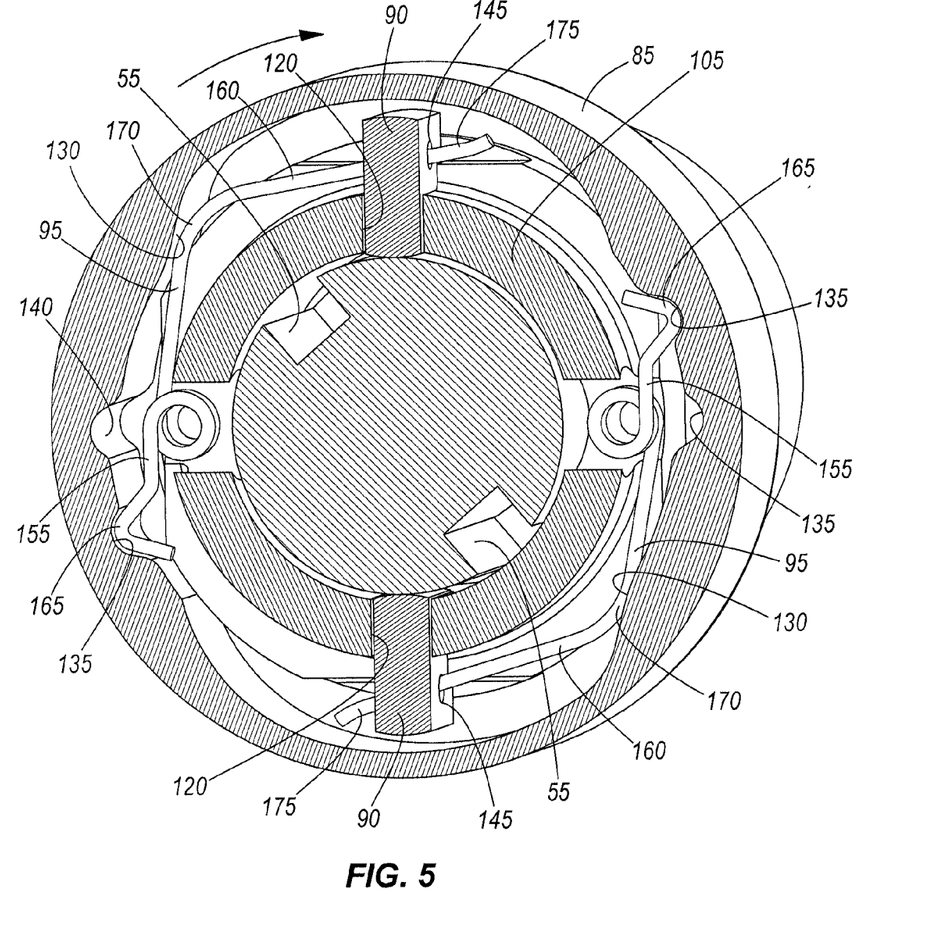
FIG. 5 is a view similar to FIG. 4, with a collar of the locking assembly moved into a locked position, but locking members of the locking assembly not engaging spindle slots on a of the tool.
Figure 6:
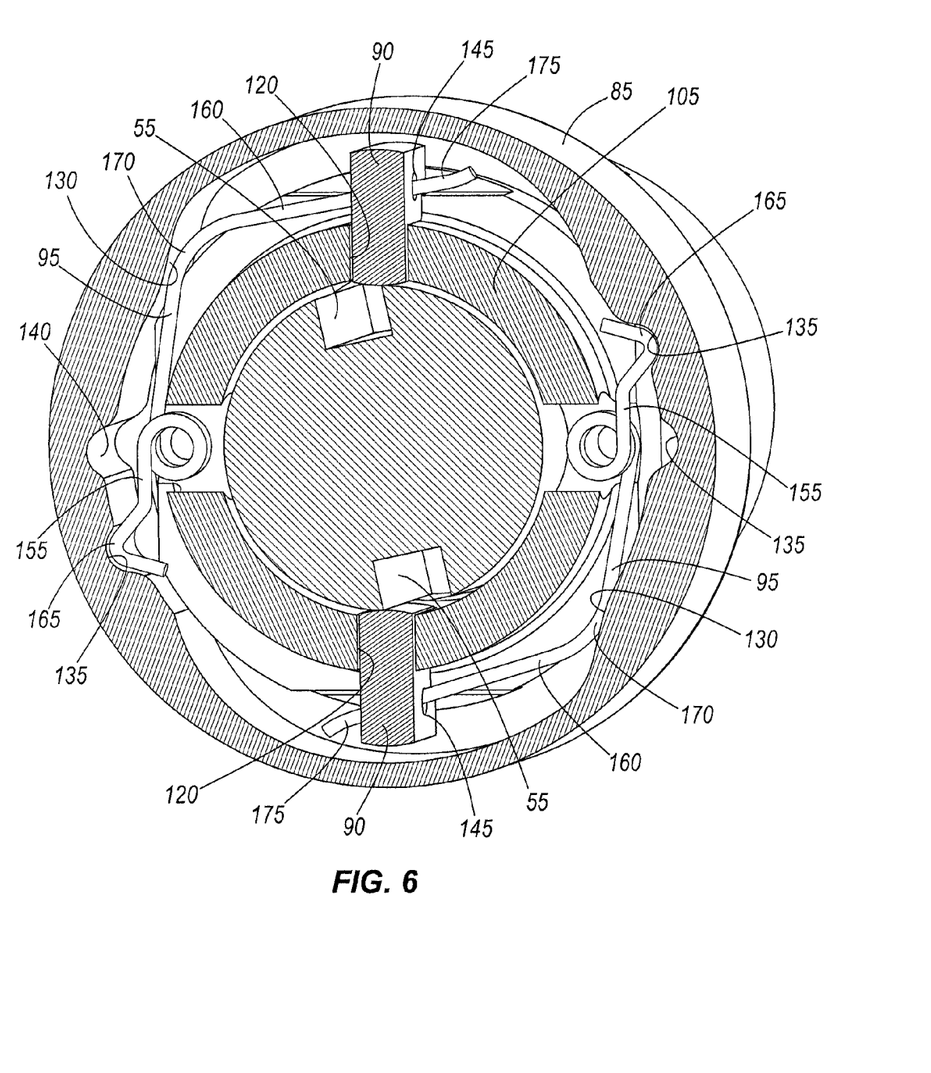
FIG. 6 is a view similar to FIG. 5, with the spindle having been rotated closer to aligning the spindle slots with the locking members.

As illustrated in FIG. 5, it is expected that in many instances during ordinary operation of the tool 10, the spindle slots 55 will not be in alignment with the radial openings 120 when the collar 85 is rotated into the locked position. In such case, the locking member 90 is moved radially into abutment with the spindle 35 with the second end 160 of the spring 95 acting on the bottom of the spring slot 145 on the near side of the locking member 90. As the collar 85 continues rotation in the locking direction, the cam surface 130 pushes on the cam-following bend 170, which pushes the tip 175 of the spring through the spring slot 145 in the locking member 90. Because the locking member 90 is prevented from moving radially, however, the second end 160 slides across and pivots on the bottom of the spring slot 145. When the collar 85 reaches the locked position, the second end 160 of the spring is non-perpendicular to the locking member 90 and bears against the bottom of the spring slot 145, generally on the near side of the locking member 90.

The spring 95 therefore accommodates movement of the collar 85 into the locked position even if the locking member 90 is prevented from moving radially into engagement with the spindle slot 55. This is because neither the cam surface 130 nor any other hard, inflexible surface acts directly on the locking member 90. Instead, a radially-directed biasing force builds up in the spring 95 as the collar 85 is moved into the locked position, such that the locking member 90 immediately snaps into the spindle slot 55 (under the influence of the radial biasing force of the spring 95) when it is rotated into alignment with the locking member 90 (see the sequence of FIGS. 5, 6, 7). It is expected that in most cases, an operator can manually rotate the spindle 35 to align the spindle slot 55 with the locking member 90, and will receive tactile and audible feedback as the locking member 90 snaps into the spindle slot 55.

If there are two diametrically-opposed locking members 90 and spindle slots 55, as in the illustrated embodiment, an operator would have to manually rotate the spindle 35 less than 180° to achieve locking of the spindle 35. In other embodiments, there can be two diametrically opposed locking members 90 and a single spindle slot 55, or there may be two diametrically opposed spindle slots 55 and a single locking member 90 to achieve a similar result. In other embodiments, there may be a single locking member 90 and single spindle slot 55 or there may be more than two of the locking members 90, more than two of the spindle slots 55, or more than two of both the locking members 90 and spindle slots 55.

Once the locking members 90 are in the spindle slots 55, the spindle 35 is locked with respect to the housing 15, because the locking members 90 extend through the radial openings 120 of the clamp nut 70, which is threaded into the housing 15. With the locking assembly 30 in the locked position, a wrench may be applied to the collet nut 65 and the collet nut 65 may be turned with respect to the spindle 35 while the operator conveniently holds the tool housing 15.

The locking assembly 30 is moved into an unlocked position by rotating the collar 85 in a second, unlocking direction (which is opposite the locking direction or counterclockwise in the illustrated embodiment). The operator is given tactile feedback that the locking assembly 30 is in the unlocked position when the detent bends 165 of the springs 95 move into the unlocked detents 140.

As the collar 85 rotates in the unlocking direction, the springs 95 relax as the cam-following bends 170 follow the cam surfaces 130 and pivot radially outwardly. As the springs 95 relax and pivot radially outwardly, they move the locking members 90 radially outwardly, which draws the locking members 90 out of the spindle slots 55. With the locking members 90 out of the spindle slots 55, the spindle 35 is free to rotate in the bearing 40 with respect to the housing 15 and normal operation of the tool 10 (e.g., with a new attachment in the collet 60) may be resumed. In the unlocked position, the springs 95 hold the locking members 90 in the unlocked positions.

In view of the foregoing, the springs 95 bias the locking members 90 toward the locked position when the locking assembly 30 is in the locked position, and hold or bias the locking members 90 toward the unlocked position when the locking assembly 30 is in the unlocked position. The locking members 90 are acted on only by the spring biasing forces and are not directly abutted by the collar 85 or cam surface 130.

Thus, the invention provides, among other things, a locking mechanism for a tool spindle, which includes a biasing member for permitting the locking mechanism to move into the locked position even when the locking member is unable to fully engage the spindle. Various features and advantages of the invention are set forth in the following claims.

What is claimed is:

1. A locking assembly for a spindle defining a longitudinal axis and having a spindle slot, the spindle supported for rotation about the longitudinal axis in a housing, the locking assembly comprising:
   a locking member supported for movement perpendicular to the longitudinal axis into and out of engagement with the spindle slot, the locking member preventing rotation of the spindle with respect to the housing when engaged with the spindle slot and permitting rotation of the spindle with respect to the housing when disengaged from the spindle slot;
   a biasing member interconnected with the locking member; and
   a collar surrounding a portion of the spindle, the collar including at least one cam surface and being rotatable about the longitudinal axis with respect to the spindle and housing between an unlocked position and a locked position;
   wherein rotation of the collar into the unlocked position enables the biasing member to bias the locking member out of engagement with the spindle slot;
   wherein rotation of the collar into the locked position causes the cam surface to abut and deflect the biasing member such that the biasing member biases the locking member toward engagement with the spindle slot;
   wherein the biasing member deflects to accommodate rotation of the collar into the locked position with the spindle slot not aligned with the locking member;
   wherein the biasing member includes a detent bend;
   wherein the collar further includes a locked detent groove and an unlocked detent groove;
   wherein the detent bend is received in the locked detent groove in response to the collar being rotated to the locked position to resist rotation of the collar out of the locked position; and
   wherein the detent bend is received in the unlocked detent groove in response to the collar being rotated to the unlocked position to resist rotation of the collar out of the unlocked position.

2. The locking assembly of claim 1, further comprising a clamp nut rotationally fixed with respect to the housing, the clamp nut including a cylindrical portion defining a central bore through which the spindle extends; wherein the cylindrical portion includes a radial opening through which the locking member is movable to engage the spindle slot when the spindle slot is aligned with the radial opening.

3. The locking assembly of claim 1, wherein the biasing member includes a portion extending through the locking member and abutting and following the cam surface as the collar is rotated into the locked position.

4. The locking assembly of claim 1, wherein the biasing member includes a pivot section that is pivotably supported with respect to the housing, such that the biasing member pivots about the pivot section as the collar is rotated between the locked and unlocked positions.

5. The locking assembly of claim 1, wherein the biasing member includes a wire spring having a first end extending through the locking member and abutting and following the cam surface as the collar is rotated into the locked position;
   wherein the biasing member further includes a second end defining the detent bend;
   wherein the collar further includes the locked detent groove and the unlocked detent groove;
   wherein the detent bend is received in the locked detent groove in response to the collar being rotated to the locked position to resist rotation of the collar out of the locked position;
   wherein the detent bend is received in the unlocked detent groove in response to the collar being rotated to the unlocked position to resist rotation of the collar out of the unlocked position; and
   wherein the biasing member further includes a pivot section between the first and second ends, the pivot section being pivotably supported with respect to the housing, such that the biasing member pivots about the pivot section as the collar is rotated between the locked and unlocked positions.

6. The locking assembly of claim 5, further comprising a pivot support pin affixed with respect to the housing; wherein the pivot section includes a loop in the wire spring; and wherein the loop extends around the pivot support pin such that the pivot support pin supports the wire spring for pivoting as the collar is rotated between the locked and unlocked positions.

7. A tool comprising:
   a housing;
   a spindle defining a longitudinal axis and having a spindle slot, the spindle supported for rotation about the longitudinal axis in the housing;
   a locking member supported for movement perpendicular to the longitudinal axis into and out of engagement with the spindle slot, the locking member preventing rotation of the spindle with respect to the housing when engaged with the spindle slot and permitting rotation of the spindle with respect to the housing when disengaged from the spindle slot;
   a biasing member interconnected with the locking member; and
   a collar surrounding a portion of the spindle, the collar including at least one cam surface and being rotatable about the longitudinal axis with respect to the spindle and housing between an unlocked position and a locked position;
   wherein rotation of the collar into the unlocked position enables the biasing member to bias the locking member out of engagement with the spindle slot;
   wherein rotation of the collar into the locked position causes the cam surface to abut and deflect the biasing member such that the biasing member biases the locking member toward engagement with the spindle slot;
   wherein the biasing member deflects to accommodate rotation of the collar into the locked position with the spindle slot not aligned with the locking member;
   wherein the biasing member includes a detent bend;
   wherein the collar further includes a locked detent groove and an unlocked detent groove;
   wherein the detent bend is received in the locked detent groove in response to the collar being rotated to the locked position to resist rotation of the collar out of the locked position; and
   wherein the detent bend is received in the unlocked detent groove in response to the collar being rotated to the unlocked position to resist rotation of the collar out of the unlocked position.

8. The tool of claim 7, further comprising a clamp nut rotationally fixed with respect to the housing, the clamp nut including a cylindrical portion defining a central bore through which the spindle extends; wherein the cylindrical portion includes a radial opening through which the locking member is movable to engage the spindle slot when the spindle slot is aligned with the radial opening.

9. The tool of claim 7, wherein the biasing member includes a portion extending through the locking member and abutting and following the cam surface as the collar is rotated into the locked position.

10. The tool of claim 7, wherein the biasing member includes a pivot section that is pivotably supported with respect to the housing, such that the biasing member pivots about the pivot section as the collar is rotated between the locked and unlocked positions.

11. The tool of claim 7, wherein the biasing member includes a wire spring having a first end extending through the locking member and abutting and following the cam surface as the collar is rotated into the locked position;
   wherein the biasing member further includes a second end defining the detent bend;
   wherein the collar further includes the locked detent groove and the unlocked detent groove;
   wherein the detent bend is received in the locked detent groove in response to the collar being rotated to the locked position to resist rotation of the collar out of the locked position;
   wherein the detent bend is received in the unlocked detent groove in response to the collar being rotated to the unlocked position to resist rotation of the collar out of the unlocked position; and
   wherein the biasing member further includes a pivot section between the first and second ends, the pivot section being pivotably supported with respect to the housing, such that the biasing member pivots about the pivot section as the collar is rotated between the locked and unlocked positions.

12. The tool of claim 11, further comprising a pivot support pin affixed with respect to the housing; wherein the pivot section includes a loop in the wire spring; and wherein the loop extends around the pivot support pin such that the pivot support pin supports the wire spring for pivoting as the collar is rotated between the locked and unlocked positions.

* * * * *